US008675667B1

(12) United States Patent
DeMartino

(10) Patent No.: US 8,675,667 B1
(45) Date of Patent: Mar. 18, 2014

(54) SYSTEMS AND METHODS FOR FORMING AND OPERATING ROBUST COMMUNICATION NETWORKS FOR AN ENTERPRISE

(75) Inventor: Kevin A. DeMartino, Bedford, MA (US)

(73) Assignee: Verizon Corporate Services Group Inc., Basking Ridge, NJ (US)

( * ) Notice: Subject to any disclaimer, the term of this patent is extended or adjusted under 35 U.S.C. 154(b) by 1961 days.

(21) Appl. No.: 11/038,696

(22) Filed: Jan. 20, 2005

(51) Int. Cl.
*H04L 12/28* (2006.01)

(52) U.S. Cl.
USPC ............................................. 370/400

(58) Field of Classification Search
USPC .................. 370/216–235, 254–258, 351–409
See application file for complete search history.

(56) References Cited

U.S. PATENT DOCUMENTS

| | | | | |
|---|---|---|---|---|
| 5,826,019 | A * | 10/1998 | Ronstrom ..................... | 709/201 |
| 6,188,671 | B1 * | 2/2001 | Chase et al. .................. | 370/232 |
| 7,152,115 | B2 * | 12/2006 | Ould Brahim et al. ....... | 709/238 |
| 7,171,491 | B1 * | 1/2007 | O'Toole et al. ............... | 709/244 |
| 2002/0049778 | A1 * | 4/2002 | Bell et al. ...................... | 707/200 |
| 2002/0152373 | A1 * | 10/2002 | Sun et al. ...................... | 713/150 |
| 2002/0198734 | A1 * | 12/2002 | Greene et al. ................. | 705/1 |
| 2003/0072263 | A1 * | 4/2003 | Peterson ....................... | 370/235 |
| 2003/0112760 | A1 * | 6/2003 | Puppa et al. ................. | 370/241.1 |
| 2004/0223500 | A1 * | 11/2004 | Sanderson et al. ......... | 370/395.53 |
| 2005/0182846 | A1 * | 8/2005 | Schofield et al. ............ | 709/232 |
| 2005/0265355 | A1 * | 12/2005 | Havala et al. ............. | 370/395.53 |
| 2006/0010026 | A1 * | 1/2006 | Nenov et al. .................. | 705/10 |
| 2006/0092916 | A1 * | 5/2006 | Harmon et al. ............... | 370/352 |

OTHER PUBLICATIONS

C. Omidyar & A. Aldridge, "An Introduction to SDH/SONET," *IEEE Communications Magazine*, vol. 31, No. 9, Sep. 1993.
R. Ramaswami & K. Sivarajan, *Optical Networks: A Practical Perspective*, Morgan Kaufman Publishers: New York, copyright 1998, pp. 431-441.
R. Ballart & Y. Ching, "Now It's the Standard Optical Network," *IEEE Communications Magazine*, vol. 27, No. 3, Mar. 1989.
"An Introduction to resilient Packet Ring Technology," Resilient Packet ring Alliance white paper, Oct. 2001.
"Adding RPR and MPLS to Existing SONET using Virtual Concatenation and GFP," Corrigent Systems Application Note, htt0p:// www.corrigent.com, Apr. 2003.

(Continued)

*Primary Examiner* — Kwang B Yao
*Assistant Examiner* — Juvena Loo

(57) ABSTRACT

Systems and methods are described for forming and operating communication networks that support the needs of an enterprise. These systems and methods include: establishing a plurality enterprise network nodes overlaid on one or more common carrier networks; establishing independence between the enterprise network and the common carrier networks; designing services provided by the enterprise network to be consistent with the current modes of operation of the common carrier networks and employing existing services of the common carrier networks to transport enterprise data; employing redundancy in communications among enterprise network nodes and in the storage of enterprise data. Compared to current enterprise networks, a network based on these methods and systems is easier to implement, is less expensive, and could be deployed more quickly. This network is not limited by the coverage and services provided by any particular carrier. With the systems and methods of this invention, the impact on the common carrier networks of providing services for an enterprise network are minimized. The redundancy associated with the systems and methods of this invention enables an enterprise network to quickly recover from a disaster and support the continuity of business operations.

20 Claims, 10 Drawing Sheets

(56) References Cited

OTHER PUBLICATIONS

"Remote Backup and recovery of Oracle Databases: the Standby Database," Computer Networks Technology, CNT White Paper, http://www.cnt.com, 2005.

"Leveraging Your Enterprise with Storage Area Networks and CNT UltraNet Solution," Computer Networks Technology, CNT White Paper, http://www.networkbuyersguide.com/search/273002.htm, 2005.

"Understanding the Alternatives for Extending Storage Area Networks," Cisco Systems White Paper, copyright 2003.

"Evaluating Leading Approaches to Distributed Applications and Databases," PeerDirect White Paper, copyright 2003, pp. 10-14.

"Frame Relay Networks," Digital Equipment Corporation, Digital Technical Journal, vol. 5, No. 1, Winter 1993.

T. Naugler, "Telephone Tutorial," Internet posting, http://jhunix.hcf.jhu.edu/~tnaugler/770.512/Common_files/TelephonyBasics/TelephoneTutorial/tutor.htm, 2005.

* cited by examiner

SYSTEMS AND METHODS FOR FORMING AND OPERATING ROBUST COMMUNICATION NETWORKS FOR AN ENTERPRISE

FIELD OF THE INVENTION

This invention relates to systems and methods for forming and operating communication networks, specifically networks that satisfy the communication needs of enterprises.

BACKGROUND

An enterprise network is defined as a network that supports the communications of a relatively large organization, such as a business or a government agency. Generally, an enterprise network involves communication equipment at multiple user (enterprise) sites interconnected through at least one common carrier network. This equipment may be owned and operated by either the user or by a common carrier.

In the United States, communication networks are geographically subdivided into different local access transport areas (LATAs). Communications within a LATA (intra-LATA communications) is provided by a local exchange carrier (LEC). Communications between users in different LATAs (inter-LATA communications) generally involves handoffs between a LEC in each LATA and an inter-exchange carrier (IXC). FIG. 1 illustrates communications between enterprise nodes in different LATAs. Each enterprise node is connected to the LEC serving its local area by an access line. End-to-end connections that pass through the LECs and IXC are established between the enterprise nodes.

Networks of certain large common carriers in the U.S. include a number of LEC networks and an IXC network. Due to the size and complexity of these common carrier networks, changes to the infrastructure of the network are very difficult to implement. Similarly, the operation and support of a large common carrier network are very complex, and the current network operation and support systems tend to be inflexible. Consequently, enterprise networks require changes to the infrastructure and/or to the operation and support of a common carrier network are difficult and costly to implement.

Nevertheless, common carrier networks provide communication services for enterprise users. These services involve equipment at a user premise, access lines, and transport through the common carrier networks. Currently, communication services for enterprises are often provided on a piecemeal basis with different user premise equipment and different modes of transport for different services.

FIG. 2 is an example schematic of an enterprise network. FIG. 2 shows a number of edge nodes connected through common carrier networks to a data center. The data center contains a centralized database with associated storage devices such as disks, servers, and networking equipment. The centralized database contains the critical data that the enterprise needs to carry out its business. In the process of performing the day-to-day business transactions of the enterprise, the edge nodes access and contribute to the contents of the centralized database. Following the completion of a transaction, any additions and changes are stored in the centralized database.

While there is a perceived advantage to centralization, there is also a potentially critical vulnerability associated with the approach shown in FIG. 2. If there is a failure at the data center then the operations for the entire enterprise can be disrupted. Redundancy at a single physical location is only partially effective in preventing this disruption. Factors outside of the control of the data center, including natural and man-made disasters, make it clear that more comprehensive protection mechanisms are needed, particularly mechanisms for protecting critical enterprise data and communications among enterprise nodes.

Remote disk mirroring, which is illustrated by FIG. 3, performs the same write operations on two disk systems, one at the primary data center, and the other at a secondary data center. To ensure survivability in the event of a failure related to physical location, the secondary data center is typically at a different geographic location than the primary data center. The two data centers are connected through a common carrier network forming part of a pipeline between the primary data center and the secondary data center. If the two data centers are geographically proximate to one another, then it may be practical to perform write operations on the local disk system (at the primary data center) and on the remote disk system (at the secondary data center) nearly simultaneously, which is referred to as synchronous disk mirroring. If the data centers are geographically separated, then it becomes impractical to perform write operations on the local and remote disk systems at approximately the same time. In this case, it becomes more practical to buffer data in the pipeline and to allow the write operations at the remote disk to lag behind the write operations on the local disk by a significant amount of time. This is referred to as asynchronous disk mirroring.

With both synchronous and asynchronous disk mirroring, certain types of disasters or system failures may result in the failure of the primary data center and the disruption of business operations. With asynchronous mirroring, a disaster may cause a significant loss of critical data disposed within the pipeline to the secondary data center. With synchronous mirroring, the loss of data is minimized if the disaster is localized. However, if the secondary data center is relatively geographically close to the primary center, then it may be affected by the same disaster. For example, a weather related disaster, such as a hurricane, may adversely affect both the primary and secondary data centers if they are geographically proximate. Preserving critical data is necessary to ensure the ability to recover following a disaster, but it is not sufficient to ensure that business operations will not be disrupted. To enable business continuity following a disaster that affects the primary data center, a method must be provided for enterprise nodes to rapidly access the data at the secondary data center and to process business transactions.

The applicant has recognized the types of problems associated with existing disaster recovery and business continuity mechanisms and has developed an approach that enhances these methods.

SUMMARY

The embodiments described herein provide exemplary systems and methods for forming and operating an enterprise communication network that include: incorporating at least two geographically separate enterprise network nodes communicating through at least one common carrier network; overlaying an enterprise network on the common carrier network; enabling independence between the enterprise network and the common carrier network; establishing enterprise network services compatible with common carrier network services; and employing redundancy in communications among enterprise network nodes.

Compared to prior art enterprise networks, an overlay network based on the systems and methods described herein is easier to implement, less expensive, and can be deployed more quickly. An enterprise network based on the systems and methods described herein is be able to interoperate with a plurality of common carrier networks and is not limited by the coverage and services provided by any particular common carrier network. Data associated with the enterprise network may be transported in a service-agnostic manner by the common carrier networks. This minimizes the impact on the common carrier networks and their operations support systems of providing transport services for the enterprise network. The redundancy provided by the systems and methods of this invention enables the enterprise network to quickly recover from a disaster and support the continuity of business operations.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION

Figure 1:
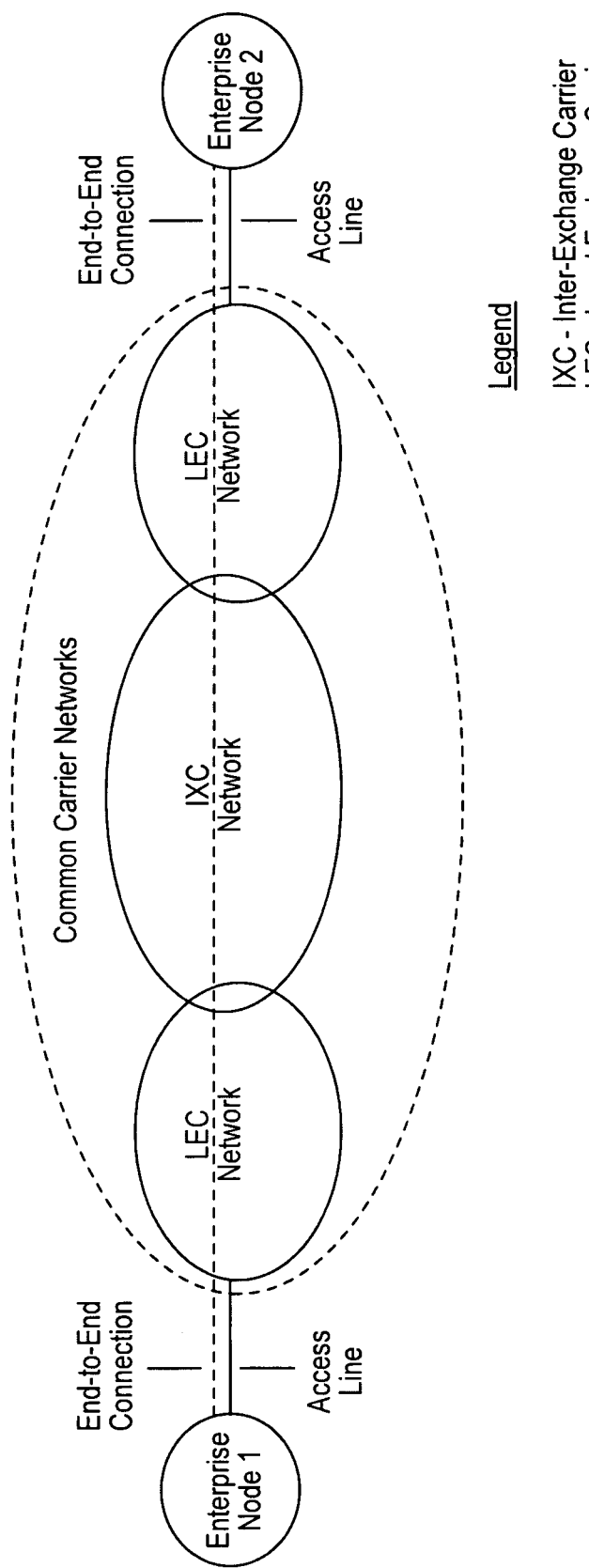
FIG. 1 illustrates a prior art enterprise network with enterprise nodes connected through common carrier networks.
Figure 2:
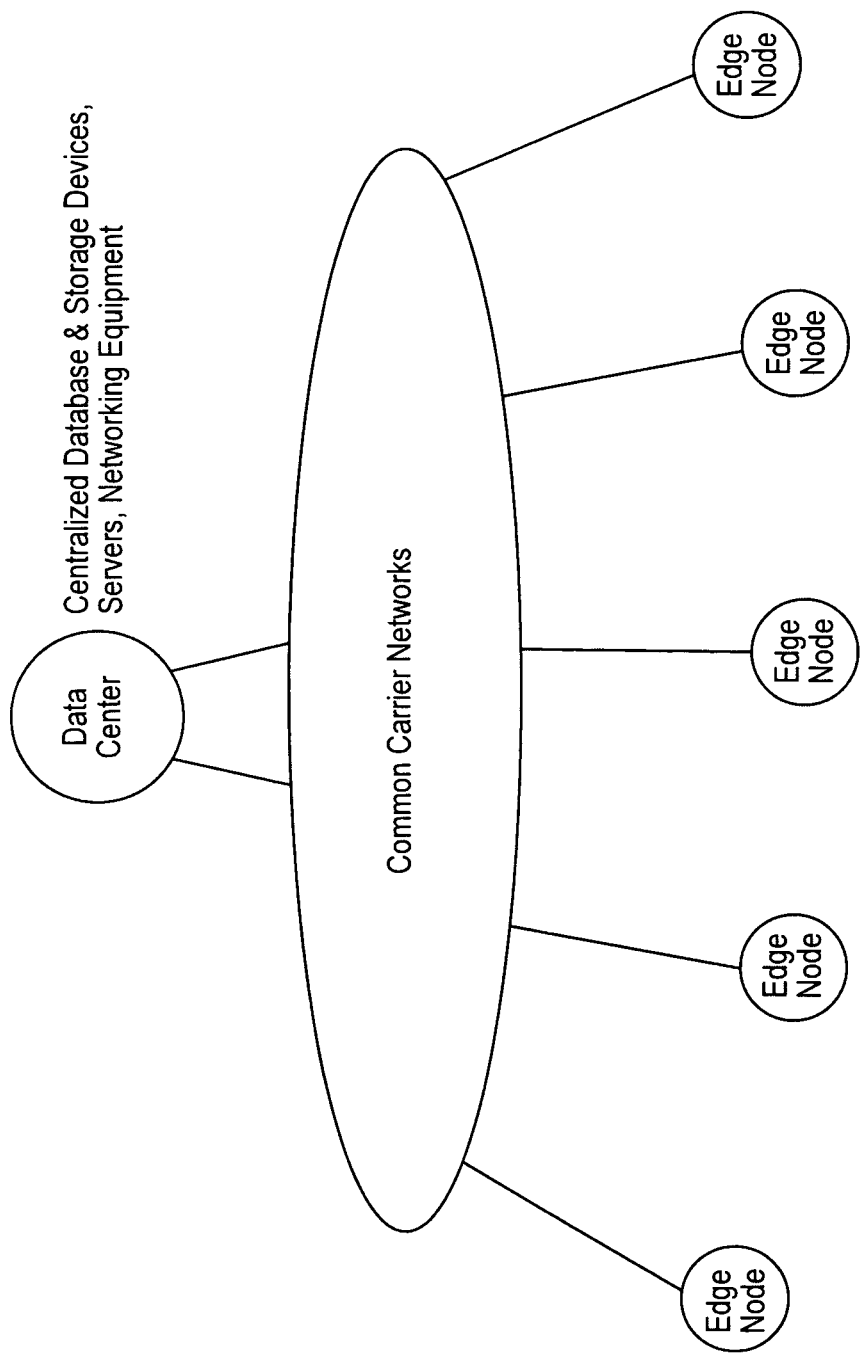
FIG. 2 illustrates a prior art enterprise network having a centralized database.
Figure 3:
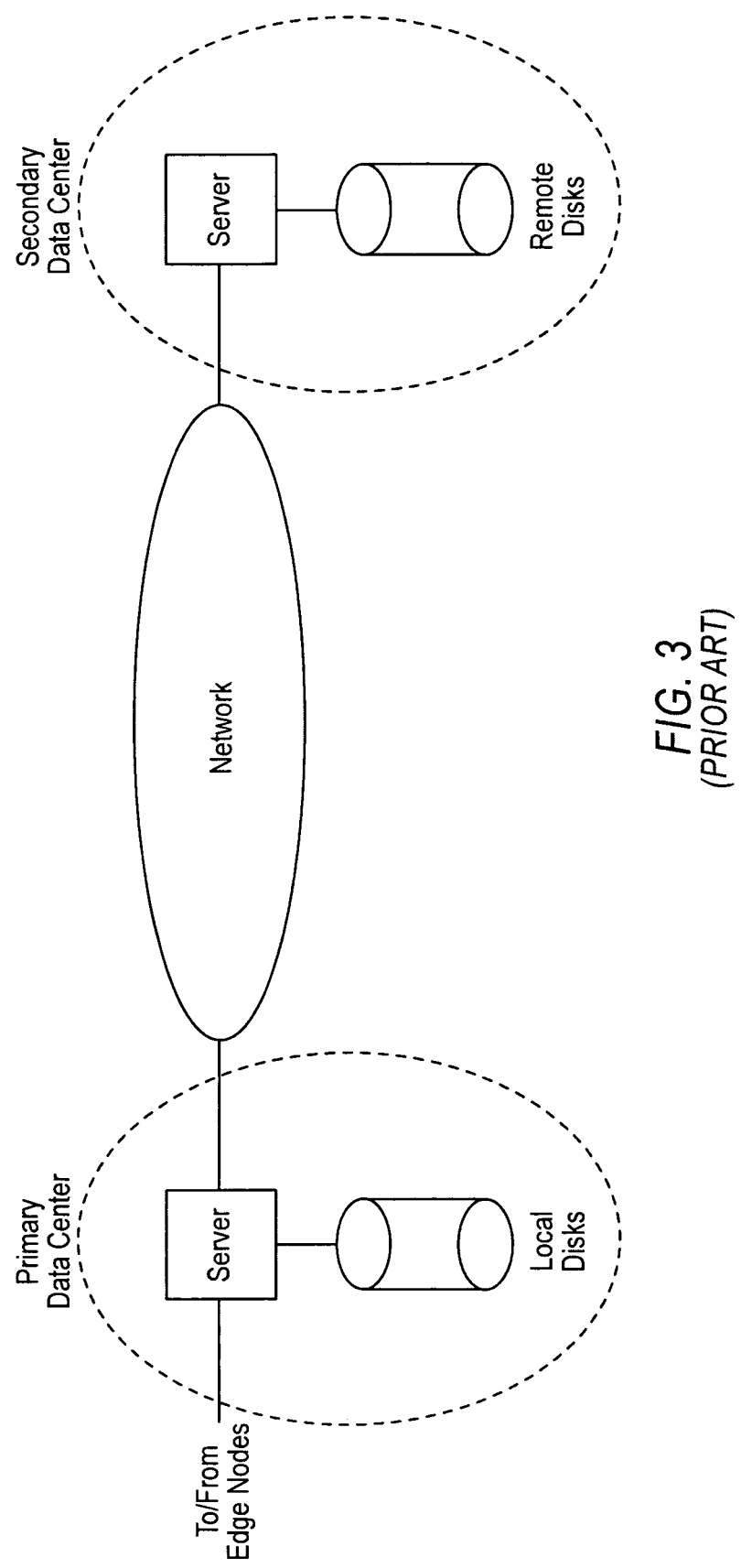
FIG. 3 illustrates a prior art remote disk mirroring technique for providing backup for a database.

Referring now to the drawings and specifically FIGS. 4 through 10, an embodiment of an enterprise network 42 is shown overlayed on at least one common carrier network 44. A plurality of enterprise nodes 46 are in communication by physical and virtual connections 48, 49 through the common carrier network 44. The drawings are not to scale and certain features or components may be exaggerated to better illustrate and explain the illustrated embodiments. Further, the embodiments set forth herein are not intended to be exhaustive or otherwise limit or restrict the invention to the precise forms and configurations shown in the drawings and disclosed in the following detailed description.

I. Characteristics of Enterprise Networks

The illustrated systems and methods relate to a formation, operation, and support of networks that provide communication functions for an enterprise, including interconnecting geographically separated sites, transferring data between the sites, distributed storage of enterprise data, and distributed transaction processing. Specifically, the systems and methods enhance the data communication, data processing, and data storage and retrieval functions associated with business transactions of the enterprise. An enterprise network 42 includes the characteristics described below.

A. Enterprise Network Overlaid on the Common Carrier Networks

An enterprise network 42 comprises multiple enterprise nodes 46 at different physical locations overlaid on at least one common carrier network 44. The overlay relationship between the enterprise network 42 and the common carrier network 44 includes: having the enterprise network nodes 46 physically separate from the nodes of the common carrier network 44; providing the enterprise network nodes 46 interconnections by physical connections 48 and virtual connections 49 through the common carrier network 44; not dedicating network elements and transmission facilities within the common carrier network 44 to the enterprise network 42, but instead sharing with other customers; dedicating common carrier resources only for the access from user site to the ingress point of the common carrier network 44 and the associated interface.

By way of analogy, the Internet may be viewed as being overlaid on the telephone networks. Existing telephone access lines and switching equipment are used in a network to provide access to Internet service providers (ISPs). The telephone networks also provide connections between ISP routers.

Figure 4:
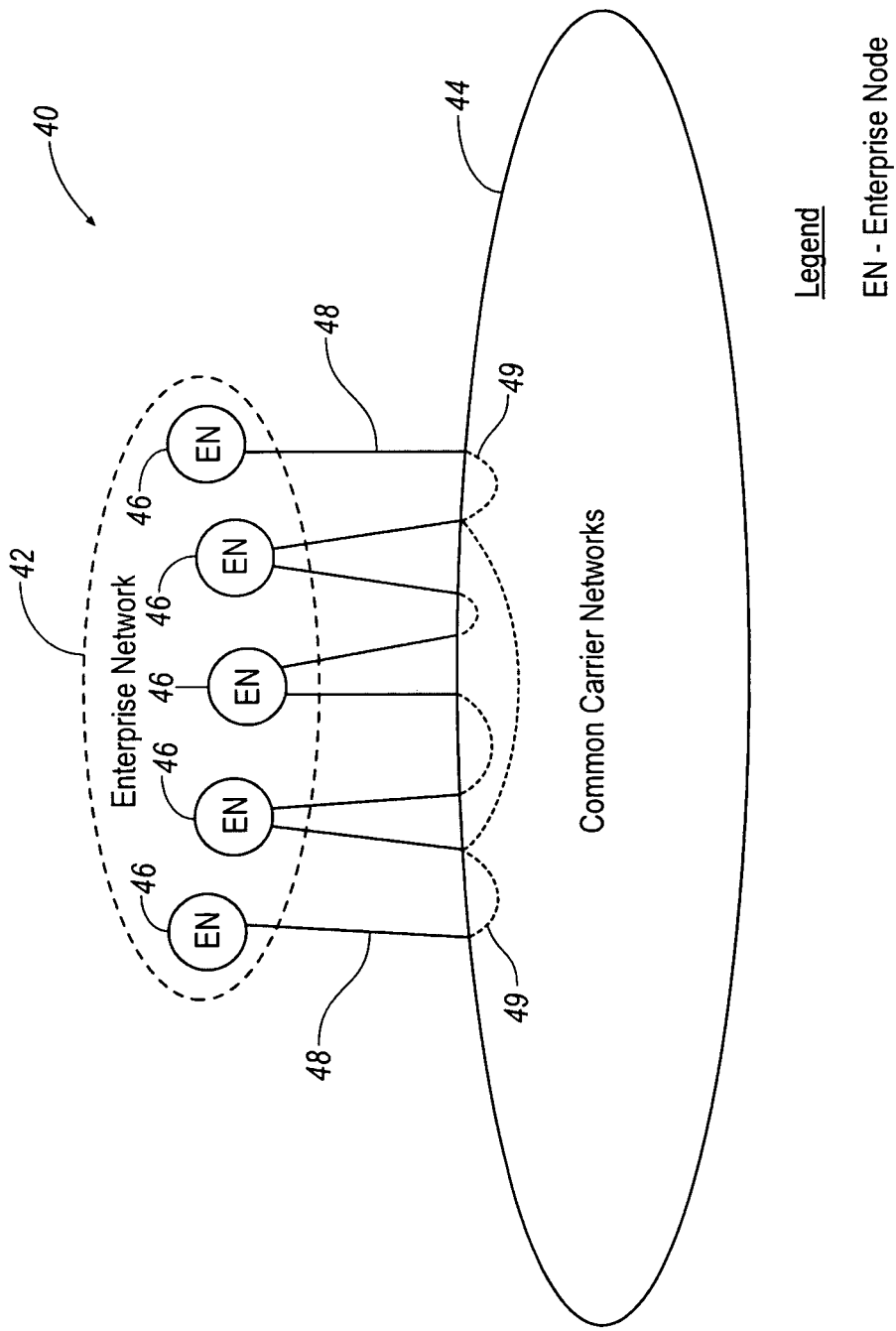
FIG. 4 illustrates an enterprise network overlaid on one or more common carrier networks.

FIG. 4 illustrates the formation of an overlay network 40 by overlying the enterprise network 42 on at least one common carrier network 44. Multiple enterprise nodes 46 are separate from common carrier nodes (not shown). Each enterprise node 46 is connected to the common carrier network 44 by at least one access line, which is an example of a physical connection 48. With a physical connection, network resources, such as transmission lines or communication channels, are dedicated to a particular data flow. The enterprise nodes 46 at different geographical locations are interconnected by physical and virtual connections 48, 49 through the common carrier networks 44. With a virtual connection, a data flow path and data flow parameters are established between two entities, but network resources along this path do not need to be dedicated to the particular data flow. Typically, a physical connection and the network resources along the path of the physical connection would be shared among multiple virtual connections. The connections 48, 49 through the common carrier networks 44 include connections through at least one LEC network and may include connections through at least one IXC network.

Overlay networks 40 are much easier to implement than networks that are tightly intertwined with the common carrier networks 44. Generally, overlay networks 40 do not require a build-out of the common carrier networks 44, except possibly for the physical connections 48. By overlaying enterprise networks 42 on common carrier networks 44, costly and time-consuming changes to the common carrier networks 44 can be avoided. Also with the overlay network 40, common carrier resources are shared by multiple users, which allows the cost of providing services to be distributed.

B. Independence from any Particular Common Carrier

To interconnect enterprise nodes 46, physical layer and virtual connections 48, 49 are established through the common carrier networks. The physical layer connections 48, 49 involve establishing communication channels dedicated to particular enterprise nodes 46 through the common carrier networks 44. The virtual connections 49 involve establishing procedures and setting parameters for transferring data through common carrier networks 44 between the enterprise nodes 46.

In one embodiment, physical layer connections between enterprise nodes 46 are based on Synchronous Optical Network (SONET) standards and protocols. At an enterprise node 46, the Generic Framing Procedure (GFP) is used to map enterprise data into SONET payloads. These payloads are transported in dedicated SONET channels through the common carrier networks. Enterprise data is extracted from the SONET payloads in an enterprise node 46 at the other end of the connection 48, 49.

To support the physical connections described above, SONET interfaces at various data rates is established between the enterprise nodes 46 and the common carrier networks 44. These SONET interfaces support data rates of at least 50 Mb/s (the fundamental SONET rate) and are implemented over communication lines including fiber optical lines between the enterprise nodes 46 and the ingress points of the common carrier network 44. As an alternative, lower rate interfaces between the enterprise nodes 46 and the common carrier networks 44 are supported using existing twisted pair access lines. In this case, enterprise data is transported from an enterprise node 46 to the ingress point of the common carrier network 44 using standard digital subscriber line (DSL) techniques. At the common carrier node, the enterprise data is mapped into SONET payloads via virtual tributaries, which are groups of time slots corresponding to a portion of a SONET payload.

Virtual connections 48 between enterprise nodes 46 are established over dedicated physical layers through the common carrier networks 44 between these nodes 46. For example, Transmission Control Protocol (TCP) virtual connections 49 may be established end-to-end between enterprise nodes 46. Virtual connections 49 may also be established by label switched paths (LSPs) in accordance with Multi-Protocol Label switching (MPLS) standards. These MPLS virtual connections are established through the Internet Protocol (IP) networks of the common carriers 44 and are supported by shared rather than dedicated physical layer channels. This enables common carrier transmission resources to be used efficiently even for highly variable (bursty) enterprise data sources.

Virtual connections 49 involve an enterprise node 46 supported by a dedicated physical layer between the enterprise node 46 and the common carrier network 44. Although this connection 48 is dedicated to particular user, it typically supports multiple virtual connections 49. Within the common carrier network 44, a physical link typically supports multiple physical layers and the flows of multiple users. An LSP within the common carrier network 44 typically supports multiple virtual connections 49.

By using standard interfaces and protocols, such as SONET and IP interfaces and protocols, the enterprise network 42 may become independent from any particular common carrier network 44. For example, the common carrier networks 44 have SONET infrastructures and provide interoperable SONET interfaces with each other and with their users. Thus, it is feasible to construct SONET connections involving multiple common carrier networks 44, including at least one LEC and at least one IXC. Similarly, there are a large number of common carriers with IP networks that interoperate with each other and with their users. The success of the Internet is due largely as a result of the ubiquity and interoperability of IP networks. Thus, it is feasible to construct virtual connections involving IP networks of multiple common carrier networks 44.

Establishing independence from any particular common carrier network 44 is important in that it enables the enterprise to obtain lower prices for communication services. However, more important is the fact that it means that the locations of enterprise nodes 46 are not constrained by the footprint of a particular common carrier network 44. If the enterprise needs only SONET and IP communication services from the common carrier networks 44, then the enterprise nodes 46 may be located anywhere where these services are supported. Since SONET is compatible with the international standards for digital data transmission and since interoperable IP networks are located throughout the world, enterprise nodes 46 may be located throughout in the world.

C. Service-Agnostic Transport

Service-agnostic transport means that the common carrier network 44 may treat the services that it provides to the enterprise the same way that it treats the services that it provides to other users. The common carrier network 44 does not need to be aware of the underlying service that the enterprise network 42 is providing. Service-agnostic transport relates to the overlay and carrier independence issues discussed above, in that it depends on the separation of enterprise and common carrier equipment and on standard interfaces and protocols. However, it also requires the separation of certain functions performed by the enterprise network 42 from functions performed by the common carrier network 44. These include transport, operations, and support functions.

By way of analogy, the services that the telephone networks provide to the ISPs may be viewed as service-agnostic transport. For example, with a dial-up connection, a customer is connected through the telephone network to the ingress point of an ISP network using a service that is essentially the same as the switched voice service. The ISP routers are interconnected through the telephone networks using private line wholesale services. The telephone networks are unaware of the e-mail and file transfer services provided by Internet services providers and Worldwide Web servers, respectively.

To enable service-agnostic transport, interfaces and protocols between the enterprise network 42 and the common carrier networks 44 are designed to be consistent with user interfaces currently supported by the common carrier networks 44. Specifically, SONET and IP interfaces and protocols are employed. In addition, the enterprise services are built upon existing transport services and modes of operation of the common carrier networks 44.

As an example of service-agnostic transport, consider the use of the GFP to map enterprise data into SONET payloads, which was previously introduced. GFP can be used to map a wide variety of different types of data into SONET payloads in an enterprise node. These SONET payloads are transported in SONET frames through the common carriers networks 44, without the payloads being opened and with the common carrier networks 44 unaware of the characteristics of the data contained in the payloads. The payloads are not unwrapped until they are delivered to the enterprise node 46. It may be a different story if the mapping occurred within the common carrier network 44. In this latter case, the common carrier nodes need to be aware of the characteristics of the data in order to map the data into SONET payloads at one end and extract it at the other end.

Another example involves IP transport. The telecommunications industry is moving toward convergence at the IP layer, especially with the trend toward voice over IP. The implication is that IP transport will be universally supported. Most types of enterprise data, including voice, computer data, and video may be transported efficiently in IP packets. At the user site, data is mapped into IP packets, either at the data source or in equipment specifically associated with the enterprise network. IP packets are then transported to the ingress point of a common carrier IP network. One option may be to map the IP packets into SONET payloads or virtual tributaries at the user site. The IP packets are transported through one or more IP networks and delivered to the enterprise node 46 at another user site.

To enable quality of service, Multi-Protocol Label Switching (MPLS) protocols are employed in support of IP services. MPLS integrates the label swapping forwarding paradigm with network layer routing. To deliver reliable service, MPLS requires a set of procedures to provide protection of the traffic carried on different paths. This requires that the label switching routers (LSRs) support fault detection, fault notification, and fault recovery mechanisms, and that MPLS signaling support the configuration of recovery.

These protocols are used to establish label switch paths (LSPs) through the common carrier networks 44 and reserve network capacity for particular data flows. MPLS protocols are widely supported by IP networks, which enable quality of service to be widely supported. An IP network that does not support MPLS may still be utilized as a transport leg. However, the quality of service for this particular leg will not be as good as the quality of services for legs through IP networks with MPLS capabilities.

The advantage of service-agnostic transport is that the services provided by the enterprise network 42 are compatible with the transport services currently supported by the common carrier networks 44, which means that the common carrier networks 44 do not need to offer new transport services or significantly modify existing services to support the communication needs of the enterprise. This implies that the cost of providing communication services and the time required to implement these services is reduced, compared to the cost and time associated with providing new services. In particular, with service-agnostic transport, the operations support systems of the common carrier networks 44 do not need to be significantly modified. Since these systems are inflexible and difficult to change, service-agnostic transport allows carrier to avoid some significant problems in providing services to the enterprise.

D. Judicious Use of Redundancy

Finally, the enterprise network 42 is designed to ensure the ability to recover quickly following a failure of the enterprise node 46 or the physical or the virtual connection 48, 49. To accomplish this, redundancy will be used judiciously to protect the enterprise data and the connections 48 through the common carrier networks 44.

FIG. 4 illustrates one embodiment of redundancy that is employed. Redundancy is shown by including additional physical connections 48 between three of the five enterprise nodes 46 and the common carrier network 44. This type of redundancy enables an enterprise node 46 to continue to communicate with the other enterprise nodes 46 even if a there is a failure in the enterprise network 42. Additional redundancy is provided to ensure that the physical and virtual connections 48, 49 through the common carrier networks 44 are quickly restored following a network failure. Critical enterprise data is stored at more than one location so that the data is recoverable following a localized disaster. The types of redundancy employed are described in detail below, and illustrations of embodiments of the various types of redundancy are provided.

The redundancy illustrated in the embodiments described herein enable enterprise networks 42 to be robust and survivable. The systems and methods described support rapid recovery following a disaster and rapid restoration of functions required for business continuity.

II. Designing Enterprise Networks

Embodiments of an enterprise network 42 are presented in the following subsections.

A. Overall Network Architecture

Figure 5:
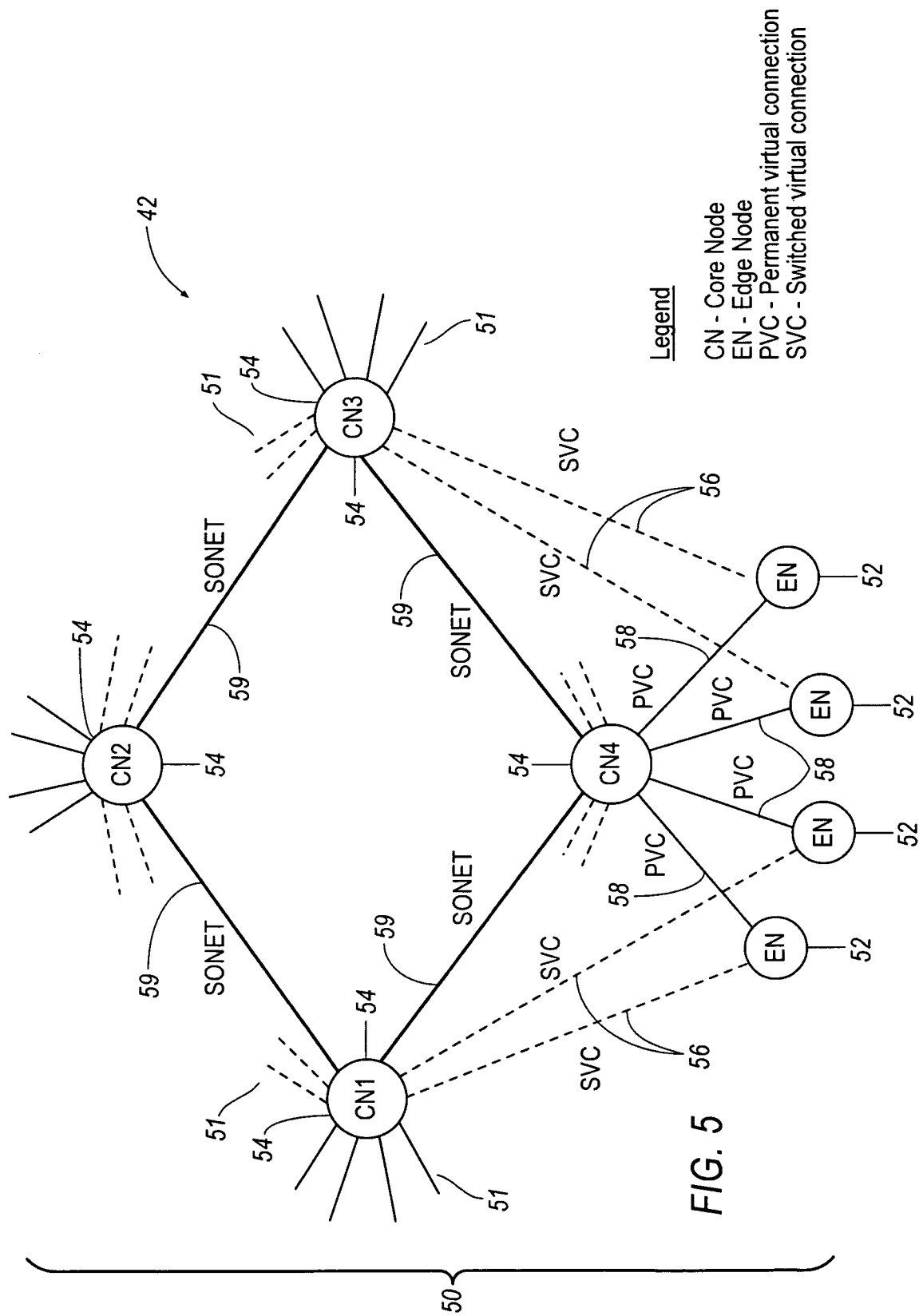
FIG. 5 illustrates the architecture for an exemplary embodiment an enterprise network.

FIG. 5 illustrates an overall enterprise network architecture 50 of an enterprise network 42 based on the systems and methods described herein. The architecture 50 comprises two types of enterprise nodes 46: edge nodes ("EN") 52 and core nodes ("CN") 54. Generally, users interface with the enterprise network 42 at the edge nodes 52, which act as clients. The core nodes 54 provide services to the edge nodes 52, and data supporting network operations is stored in the core nodes 54.

The network of FIG. 5 contains four core nodes 54 and sixteen edge nodes 52, only four of the edge nodes 52 are shown. However, alternative arrangements are contemplated, including arrangements having different numbers of core nodes 54 and edge nodes 52, arrangements having a single type of node, and arrangements have more than two types of nodes.

In one example, the enterprise network 42 of FIG. 5 could be the enterprise network 42 for a retail chain with 16 retail stores (edge nodes 52) and four support centers (core nodes 54), with each support center (core node 54) serving four stores (edge nodes 52) in its local area. The edge nodes 52 correspond to the retail stores while the core nodes 54 correspond to the support centers.

To support enterprise operations, communications are required among the core nodes 54 and between the edge nodes 52 and the core nodes 54. Physical and virtual connections 48, 49 through the common carrier network 44 are established to support these communications. In FIG. 5, these connections are indicated simply by solid and dashed lines 56, 58, and 59. In reality, these connections involve transmission lines, channels, and switching equipment within the common carrier networks 44, which are not shown in FIG. 5.

In FIG. 5, each core node 54 is connected to multiple edge nodes 52, and each edge node 52 is connected to two core nodes 54. The non-terminated solid and dashed lines 51 are connected to edges nodes 52 that are part of the enterprise network 42, but which are not shown in FIG. 5.

The core nodes 54 in FIG. 5 are interconnected by physical layer connections 59, in this case SONET connections but other connections are contemplated including various physical and virtual connections. Each edge node 52 is connected to two core nodes 54 by virtual connections 56 and 58. The primary connection from an edge node 52 is a permanent virtual connection (PVC) 58 while the backup connection is a switched virtual connection (SVC) 56. Other options could be employed for these physical and virtual connections 49, 49, including various wireline and wireless connections.

The enterprise network 42 of FIG. 5 is overlayed on the common carrier networks 44, which provide physical and virtual connections 48, 49 (as shown in FIG. 4) among the enterprise nodes 46. Standard interfaces and protocols, specifically SONET and IP interfaces and protocols are employed between the enterprise nodes 46 and the common carrier networks 44. As a result, the enterprise network 42 illustrated in FIG. 5 is carrier-independent. The enterprise network 42 of FIG. 5 employs existing network services, specifically SONET and IP transport services, which enables service-agnostic transport.

To ensure the survivability of enterprise data, critical data is stored at more than one core node 54 or edge node 52. In one embodiment, critical data is stored in at least two core nodes 54, and at least one edge node 52 includes virtual connections 56 and 58 to the core nodes 54 storing data relevant to the edge node 52. This enables the edge node 52 to access the data it needs in spite of failures of the core node 54 and/or the connection to the core node 54. The enterprise network 42 illustrated in FIG. 5 provides redundancy in an efficient manner so that the enterprise network 42 is robust and survivable while minimizing complexity.

B. Core Network

Figure 6:
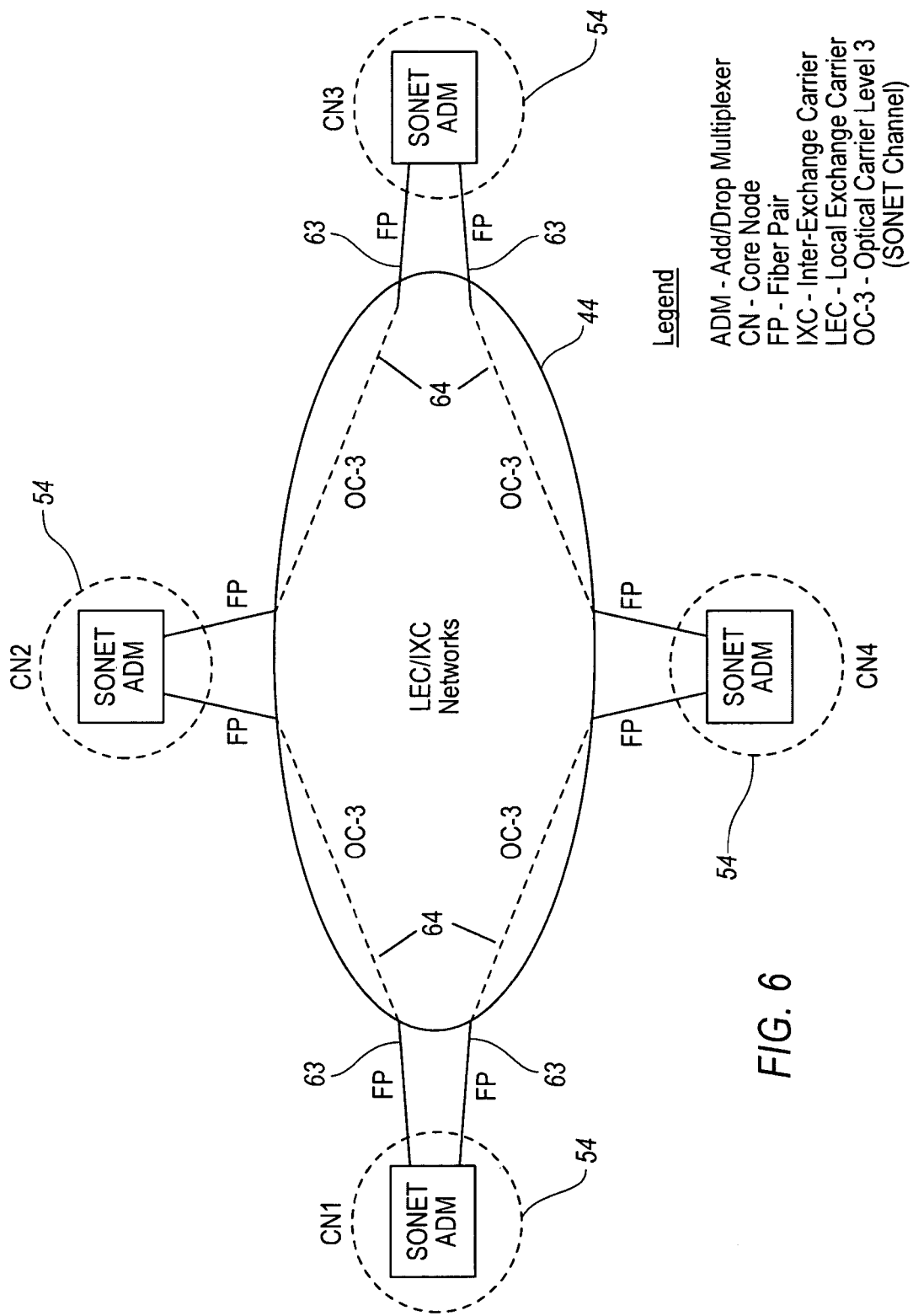
FIG. 6 illustrates a core of an enterprise network overlaid on a SONET infrastructure of the common carriers.

FIG. 6 shows an embodiment of a segment of the enterprise network 42 of FIG. 5 that includes the core nodes 54. Enterprise data is distributed among the core nodes 54. The core nodes 54 in FIG. 6 are interconnected through the common carrier networks 44 such that each core node 54 (CN1) is directly connected to at least two other core node 54 (CN2 and CN4) and indirectly connected the another core node 54 (CN3) by an intermediate core node 54 (CN2 or CN4). In the embodiment of FIG. 6, the core nodes 54 are connected to the common carrier networks 44 by optical fibers 63, however, any broadband connection is contemplated between the common carrier networks 44 and the core nodes 54. In an embodiment as shown in FIG. 6, each core node 54 is connected to the common carrier networks 44 by a fiber pair (FP) 63 in two places. FIG. 6 shows the core nodes 54 interconnected in a ring configuration. However, a mesh topology is also appropriate for interconnecting core nodes 54.

In an embodiment as shown in FIG. 6, standard SONET interfaces and channels 64 are used to interconnect the core nodes 54. In this case, OC-3 interfaces and channels 64, which support a data rate of 155 Mb/s, are employed. Depending on the volume of traffic, other SONET rates may be more appropriate for other embodiments. In the embodiment of FIG. 6, four sets of SONET channels 64 are provided by the common carrier networks 44 to establish physical layer connections between a first core node CN1 and a second core node CN2, between the second core node CN2 and a third core node CN3, between the third core node CN3 and a forth core node CN4, and between the fourth core node CN4 and the first core node CN1. Since SONET networks are located throughout the world, this enables the core nodes 54 to be located nearly anywhere in North America. Alternately, the interfaces and channels may be based on the Synchronous Digital Hierarchy (SDH) standards, the international standards for digital data transmission, rather than on the SONET North American standards. This enables the enterprise nodes 42 to be located outside of North America.

A SONET (or SDH) ring 60 with SONET protection is established through the four core nodes 54 illustrated in FIG. 6. When a failure occurs that disables a SONET channel 64 between a pair of core nodes 54, the affected traffic is automatically routed around the ring 60 in an opposite direction.

Figure 7:
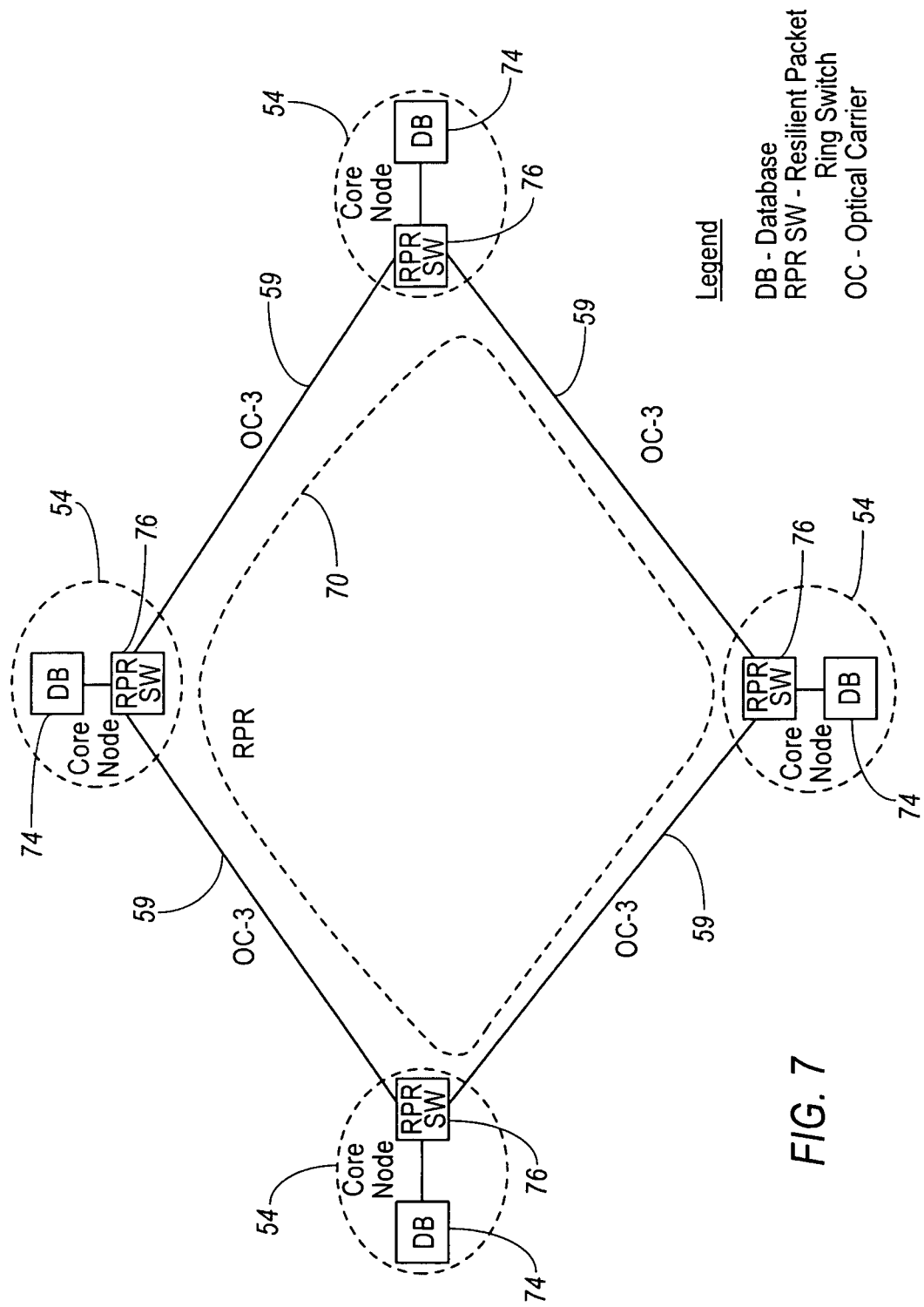
FIG. 7 illustrates a resilient packet ring forming a core of an enterprise network.

With the SONET type ring 60, capacity around the ring 60 must be dedicated for protection, which means that this capacity is not available for transport. A more efficient and more flexible step for providing communication and protection against failures is to interconnect the core nodes 54 using a resilient packet ring (RPR) or "ring" 70 as shown in FIG. 7. The RPR concept fits with the goal of interconnecting the core nodes 54 via an overlay network 40 as shown in FIG. 4.

FIG. 7 illustrates the step of interconnecting the core nodes 54 using an RPR 70. The common carrier networks 44 are suppressed and each connection 59 between core nodes 54 is shown as a solid line. The core nodes 54 are still connected by OC-3 SONET channels. However, the SONET protection is disabled, and no capacity around the ring 70 is dedicated for protection. As mentioned above, other types of connections are contemplated in alternate embodiments including various physical and virtual connections.

The step of interconnecting the core nodes 54 further includes providing switching elements 76 at the core nodes 54 that implement RPR functions. Within the core nodes 54, the RPR switching elements are connected to storage elements containing enterprise data. Generally, the RPR protocol is used in conjunction with Ethernet protocols. Enterprise data is encapsulated in Ethernet frames, which are mapped into SONET payloads for transport. At each of the core nodes 54, Ethernet frames are added, dropped, and passed through. Further, at each of the core nodes 54, the rates of the data added, dropped, and passed through vary dynamically based on traffic demands. Compared to a SONET type ring 60 where the ring capacity is dedicated to particular data flows, the dynamic sharing enabled by RPR 70 results in more efficient utilization of RPR 70 capacity.

Generally, data flows in both directions around the RPR 70. If a failure occurs that disables a connection 59, data previously flowing through this connection 59 is routed around the ring 70 in the opposite direction. A failure that disables a connection 59 between core nodes 54 reduces the overall ring capacity, and certain data flows need to be throttled back. However, this reduction in RPR 70 capacity under failure conditions is no greater than the reduction in RPR 70 capacity under normal conditions to accommodate SONET protection.

An alternative communication approach to using dedicated SONET channels to interconnect core nodes 54 on the RPR 70 includes using IP tunnels through common carrier networks 44. For example, the SONET connection may be established between at least two of the core nodes 54 and an IP network (not shown). Enterprise data from one of the core nodes 54 is sent through a SONET connection to the ingress point of the IP network and then tunneled through the IP network. At the other end of the IP network, this data is sent through the other SONET connection to the core node 54. Compared to straight SONET transport, this alternative is more efficient for transporting data over long distances, but delays and delay variations (jitter) through the transport network are greater.

The embodiments illustrated in FIGS. 6 and 7 exhibit all four of the characteristics described in section I. The networks illustrated in FIGS. 6 and 7 are clearly overlaid on the common carrier networks 44, with the enterprise nodes 46 being separate from the common carrier nodes (not shown) and the common carrier networks 44 interconnecting the enterprise nodes 42. The use of SONET interfaces with the common carrier networks 44 and the use of standard SONET channels through the common carrier networks 44 enable the enterprise network 42 to be carrier-independent. The use of SONET or IP transport enables service-agnostic transport by the common carrier networks 44. Redundancy is provided in the form of two access connections 63 for each core node 54, each core node 54 having connections 59 to two other core nodes 54, and the redundancies associated with SONET protection or RPR protection.

C. Interaction Between the Core Nodes and Edge Nodes

Figure 9:
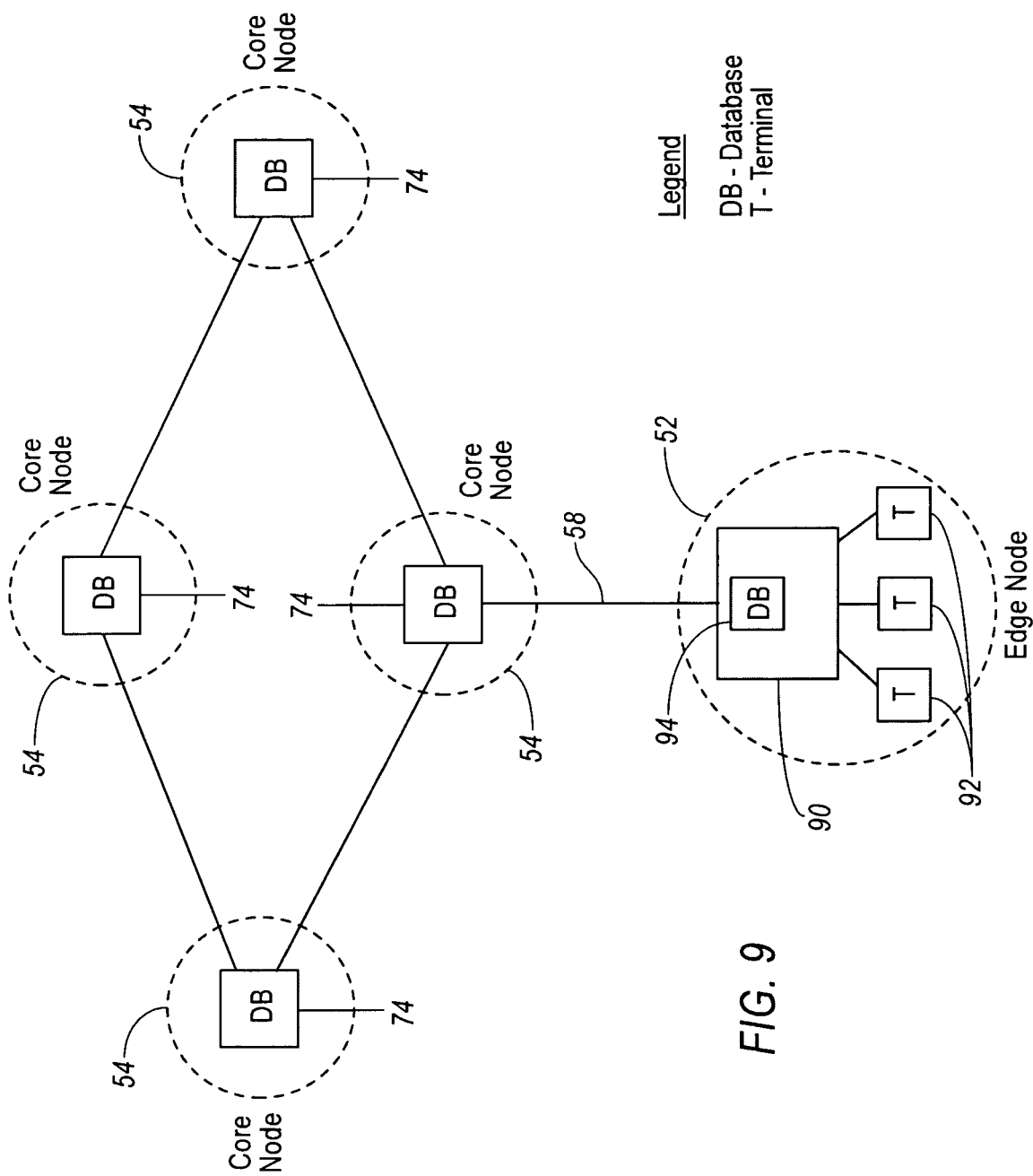
FIG. 9 illustrates elements of an enterprise network associated with distributed transaction processing.

The embodiment shown in FIG. 5 shows each of the edge nodes 52 connected by the permanent virtual connection (PVC) 58 to at least one of the core nodes 54 in its geographic area and by at least one switched virtual connection (SVC) 56 to at least one other core node 54. Virtual connections 56 and 58 utilize network capacity more efficiently than dedicated physical layer connections, and providing connections 56 and 58 to at least two core nodes 54 ensures survivable access to databases 74, as shown in FIG. 9, in the core nodes 54 of the enterprise network 42. Other mechanisms for providing survivable access are also contemplated.

The enterprise network 42 includes the distribution of data throughout the enterprise. As described in more detail below, the core nodes 54 receive data from the edge nodes 52. Each of the core nodes 54 as illustrated in FIG. 7 includes a database 74 containing a subset of the enterprise data. Data required for business operations is stored at more than one core node 54. Data is replicated and transferred along the rings 60 and 70, as shown in FIGS. 6 and 7, to other core nodes 54. As a result, more than one copy of the enterprise data is shared among more than one core node 54 such that if a core node 54 is disabled, none of the data is lost. If a core node 54 becomes unavailable or if the rings 60 and 70 becomes partially or completely disabled and other mechanisms of communication are also affected, the enterprise data is synchronized when the core nodes 54 again come into contact with one another.

Enterprise network users interact with the edge nodes 52, and transactions are generally initiated at the edge nodes 52. As illustrated in FIG. 5, each of the edge nodes 52 is connected to two different core nodes 54 along spatially diverse paths. Generally, the data flow between one of the edge nodes 52 and at least one of the core nodes 54 is bursty. "Bursty" means that the data rate is highly variable, i.e., the peak data rate is much greater than the average data rate. This implies that packet-based transport between the edge nodes 52 and the core nodes 54 is considerably more efficient than dedicated channels. Consequently, virtual connections 56 and 58, such as Transmission Control Protocol/Internet Protocol (TCP/IP) connections are established between the edge nodes 52 and the core nodes 54.

In one embodiment, each of the edge nodes 52 is supported by at least one of the core nodes 54 in its geographic area, a primary core node 54, and by one or more alternative core nodes 54 outside of the local area. As discussed above, each of the edge nodes 52 access the database 74 in at least one of the core nodes 54, and each of the core nodes 54 stores the results of the transactions initiated by the edge nodes 52 attached to the core node 54. Support for an edge node 52 may be disrupted by a failure at its primary core node 54 or by a failure along the connection 58 between the edge node 52 and the primary core node 54. In this case, however, disruption is avoided by utilizing the connection 56 to an alternate core node 54, which may be in another geographic area. As a result, problems with enterprise data being inaccessible are minimized. Moreover, by establishing communications between various core nodes 54, each having at least a subset of the overall enterprise data in a redundant format, the data may be synchronized on a global basis and any inconsistencies in the data readily addressed.

At least one permanent virtual connection (PVCs) 58 is established through the common carrier networks 44 between each of the edge nodes 52 and its primary core node 54. Preferably, these connections 56 and 58 are TCP/IP connections. However, connections using the Asynchronous Transfer Mode (ATM) or Frame Relay connections could also be used. Alternately, TCP/IP connections may be established over ATM or over Frame Relay. If one of the edge nodes 52 is close to one of its supporting core nodes 54, then a private line connection (not shown) may be established instead. Permanent virtual connections 58 may be "always on," but do not tie up network capacity if there were little or no traffic flowing through them.

In contrast, switched virtual connections (SVCs) 56 are preferably established between the edge nodes 52 and their backup core nodes 54. These connections may also be at least one of a TCP/IP, ATM, and Frame Relay connection. The SVC 56 connections are activated if a failure occurs at one of the primary core nodes 54 or a failure of the PVC 58 disrupts communications with one of the primary core nodes 54. A financial benefit of utilizing SVCs 56 is that they reduce monthly charges for PVCs 58.

As previously discussed, the connections between the core nodes 54 and the common carrier networks 44 may include the use of a fiber lines 63 and SONET channels 64 through the common carrier networks 44 in an embodiment as described above.

The communications connections 48 between the edge nodes 52 and the common carrier networks 44, as shown in FIG. 4, generally may include using a twisted pair connection (not shown) or a fiber line. The use of twisted pair connections enables existing access lines to be used and avoids the costs associated building out the network to the edge nodes 52. When twisted pairs are used, digital subscriber line (DSL) techniques, which can support data rates in megabit per second range, are appropriate and are generally adequate for most edge nodes 52.

Figure 8:
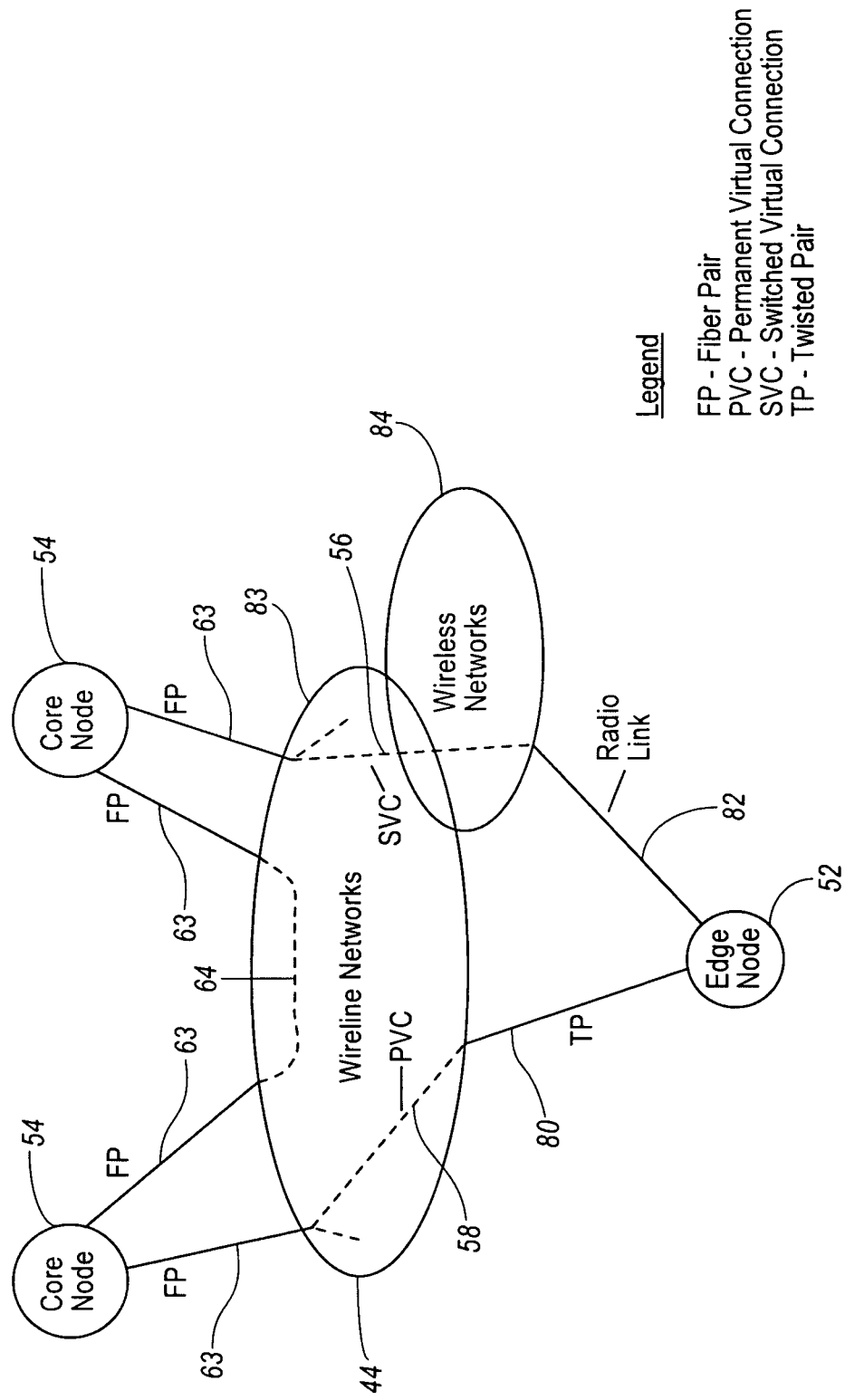
FIG. 8 illustrates survivable communications between an edge node and the core of an enterprise network.

FIG. 8 illustrates the employment of redundancy at one of the edge nodes 52. The goal is to address a concern that a single failure may disable both the connection from the edge node 52 to its primary core node 54 and its connection to one of the backup core nodes 54. In this case, both a wireline connection 80, 56, 58 and a wireless connection 82 are employed. The virtual connection 58 between one of the edge nodes 52 and its primary core node 54 involves a twisted pair link to the wireline networks 83. The virtual connection 56 to one of the backup core nodes 54 includes a wireless connection 82 shown as a radio link to a wireless network 84, which ties into the wireline networks 83. Both the wireline networks 83 and the wireless networks 84 are common carrier networks 44.

The use of standard interfaces and protocols for the connections between the edge nodes 52 and core nodes 54 and the use of IP transport through the common carrier networks 44 further enables the enterprise network 42 to be carrier-independent and enables service-agnostic transport through the common carrier networks 44. The use of redundant connections between the edge nodes 52 and the core nodes 54 enable communications among the nodes to be maintained and enterprise data to be transferred even if link and/or node failures occur.

D. Distributed Applications and Distributed Data

Enterprise data and application software associated with storing and retrieving data can be concentrated in the core nodes 54 of the enterprise networks 42. However, additional benefits can be achieved if data and applications are distributed throughout the enterprise network 42. The distribution of data allows the enterprise to continue to function even if one or more databases are disabled or disconnected. Transaction processing can distributed throughout the enterprise network 42 so that the edge nodes 52 can operate autonomously for a period of time if that edge node 52 is disconnected from other parts of the enterprise network 42.

As illustrated in FIG. 9, application software and data associated with transaction processing of enterprise data may be distributed among the core nodes 54 and the edge nodes 52. An enterprise database 74 is distributed over the four core nodes 54. In this case, at least one of the edge nodes 52 contains a portion of the enterprise database 94.

Each core node 54 in FIG. 9 contains a database server (not shown) and at least one storage device containing a specific portion of the enterprise database 74. A core node 54, by way of example, may also be a central data processing center with redundant power, communication, and security providing the enterprise with a location that ensures data integrity. The core nodes 54 may also be rented from a third party as space in a cabinet providing the redundancy and security discussed above for enterprise data.

The edge node 52 in FIG. 9 contains the portion of the enterprise database 94 related to its local operations. The edge node 52 also contains a server 90 hosting certain transaction applications. Multiple user terminals 92 may be directly connected to this server. Ideally, an edge node is connected to two or more core nodes 54 along spatially diverse paths. However, this may be impractical or too costly in some cases. In the case shown in FIG. 9, an edge node 52 may be connected to only a single core node 54.

Typically, a transaction is initiated at an edge node 52, which accesses data from the enterprise database 74 in the core nodes 54. Following the completion of a transaction, the results are transferred to at least one of the core nodes 54. However, transactions can be executed autonomously at one of the edge nodes 52, if the edge node contains the portion of the database required for transactions and a transaction processing capability. For example, if the edge node 52 in FIG. 9 contains records for local users (customers) then it can autonomously process transactions for these users.

If the connections 58 from one of the edge nodes 52 to the core nodes 52 are disabled or if the enterprise network 42 is disabled, an edge node 52 may operate autonomously for a period of time. To be able to serve non-local users, the edge node 52 needs to store additional data beyond the records for required by the local users. For example, if a database 94 at the edge node included a list of bad credit card numbers, it is able to process transactions for non-local customers, but not update the master records by these customers. Eventually, the edge node 52 re-establishes connections with the core nodes 54 so that the enterprise database is updated and data is reconciled throughout the enterprise network 42.

The distribution of applications and data as described above is an efficient way to implement redundancy and to provide robustness and survivability. Distribution of applications and data enables business operations to continue in spite of multiple failures, even if a enterprise node is temporarily is isolated from other nodes.

III. Operation and Support of Enterprise Networks

For overlay networks, the operation and support of common carrier networks 44 can be decoupled from the operations and support of the enterprise network 42. The methods described herein are employed to form at least one enterprise network 44 that is not subject to the constraints associated with the operations and support systems of the common carriers as further discussed below.

The separation of operations support from the support of common carrier networks 44 is motivated by the inflexibility of the operations and support systems of the common carrier networks 44. For some common carrier networks 44, the operations support systems are archaic. This makes it difficult to incorporate functions associated with support of enterprise networks 42 into operations and support systems of certain common carriers. It is also difficult for the operations and support organizations of certain common to accommodate enterprise networks 42. Thus, it is desirable to find an alternative approach for providing operations support, recognizing the pre-existing reality. As discussed below, the main advantage of decoupling operations support from the common carriers existing support infrastructure is that the constraints imposed by this infrastructure are avoided.

Figure 10:
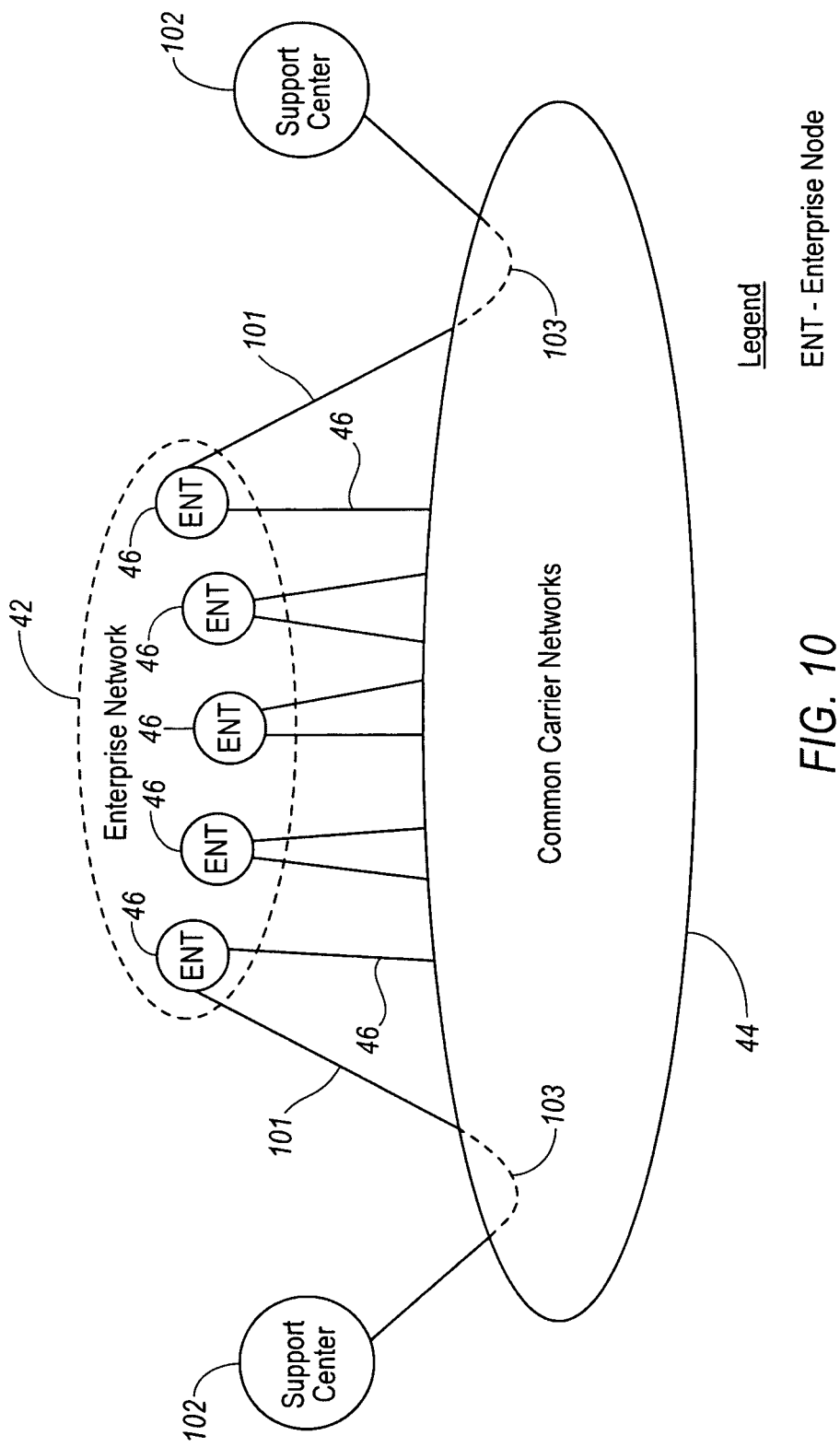
FIG. 10 illustrates decoupling of the operation and support of an enterprise network from the operation and support of the common carrier networks.

In FIG. 10, the separation of operations support for the enterprise network 42 from common carrier networks 44 is shown. This step includes having support centers 102 of the enterprise or a third party, such as a supplier of the equipment at the enterprise nodes 46, monitor and control the enterprise network 42. To enable this support, management data, including alarms and performance monitoring data, is communicated from the enterprise network 42 to a support center 102. Also, data is sent from the support center 102 to the enterprise nodes 46 to control, configure, and activate the enterprise nodes 46. In this case, there are at least two connections through the common carrier networks 44 to separate support centers 102. Alternately, the support centers 102 may be collocated in at least one of the core nodes 54, which makes financial sense if the support centers 102 belonged to the enterprise user.

The separation of operation support includes having management data communicated among the enterprise nodes 46, including both the core nodes 54 and the edge nodes 52 using the rings in FIG. 6 and FIG. 7 and the edge-to-core connections described above. This allows each one of the edge nodes 52 and core nodes 54 to communicate with the support center 102 without requiring separate lines from each one of the edge nodes 52 and core nodes 54 to a support center 102. This management data is encapsulated in Ethernet frames for transport through the enterprise network 42.

In the embodiment of FIG. 10, there are two support center nodes 102, each connected through the common carrier networks 44 to a different enterprise node 46. This approach provides protection against failures at an enterprise node 46, or failures at support center node 102, or failures along the connection between these nodes 101. To support connections between the enterprise nodes 46 and the support centers 102, twisted pair or wireless access links 101 and switched or permanent connections 103 through the common carrier networks 44 could be employed.

Moreover, in one embodiment, the support center 102 isolates a failure when an alarm signal is sent indicating the failure in the enterprise network 42. If the user is providing its own support, then maintenance actions are directed from one of the core nodes 54 containing the support center 102. If support is provided by a third party site, then the alarm is sent to the support center 102. Often, the easiest form of implementation is to establish a telephone connection, either private line or switched, between at least one of the core nodes 54 and the support center 102.

This maintenance actions associated with a failure are typically directed and controlled from the support center 102. The common carrier networks 44 are notified when a failure occurs in the enterprise network 42. Otherwise, the common carriers waste time attempting to isolate a failure in their own network. The common carrier is also notified if the support center 102 detects a failure in the common carrier's network.

IV. Alternative Embodiments

The preceding description has been presented only to illustrate and describe exemplary embodiments of the methods and systems of the present invention. It is not intended to be exhaustive or to limit the invention to any precise form disclosed. The invention may be practiced otherwise than is specifically explained and illustrated without departing from its spirit or scope. The scope of the invention is limited solely by the following claims.

What is claimed is:
1. A method, comprising:
generating an enterprise network by incorporating a plurality of geographically separated enterprise sub-networks communicating through a plurality of common carriers, each enterprise sub-network including a plurality of edge nodes interfacing with users and a core node;

separating the enterprise network from the plurality of common carriers by providing to the enterprise network from the plurality of common carriers agnostic transport services for the communications through the plurality of common carriers; and enabling redundancy in the communications among the plurality of geographically separated enterprise sub-networks at least by:
- connecting at least a subset of the edge nodes of a same geographically separated enterprise sub-network to the core node of another geographically separated enterprise sub-network and
- distributing enterprise data among the plurality of geographically separated enterprise sub-networks to enable autonomous transaction execution by any edge node of a respective geographically separated enterprise sub-network when that respective geographically separated enterprise sub-network is disconnected from the enterprise network.

2. The method of claim 1, wherein incorporating the plurality of geographically separated enterprise sub-networks includes interconnecting the core node of a first of the plurality of geographically separated enterprise sub-networks to the core node of at least a second of the plurality of geographically separated enterprise sub-networks through the plurality of common carriers by a plurality of physical and virtual connections through the plurality of common carriers.

3. The method of claim 1, wherein separating the enterprise network from the plurality of common carriers further includes:
- utilizing common carrier interfaces and common carrier equipment that are separate from the services of the plurality of common carriers to support the communications through the plurality of common carriers, and
- enabling the enterprise network to transport and support the communications through the plurality of common carriers independent of control by the plurality of common carriers.

4. The method of claim 1, wherein distributing the enterprise data includes distributing the enterprise data throughout the core nodes.

5. The method of claim 1, wherein generating the enterprise network includes interconnecting the core nodes by a SONET/SDH ring through the plurality of common carriers.

6. The method of claim 1, wherein distributing the enterprise data includes distributing at least a subset of the enterprise data to the edge nodes and their corresponding core nodes.

7. The method of claim 1, further comprising:
independently operating and independently supporting the enterprise network and the plurality of common carriers.

8. The method of claim 1, wherein distributing the enterprise data includes distributing to, and storing at, the edge nodes at least a subset of the enterprise data.

9. The method of claim 1, further comprising:
- detecting, in an edge node, that at least one of a connection to the core nodes is disabled and the enterprise network is disabled; and
- autonomously executing at least one transaction in the edge node.

10. The method of claim 1, wherein the enterprise data includes data associated with transaction processing of the enterprise data that is distributed to at least one of the enterprise nodes and is non-local to the at least one of the plurality of geographically separated enterprise sub-networks.

11. A system configured to:
generate an enterprise network through an incorporation of a plurality of geographically separated enterprise sub-networks that communicate through a plurality of common carriers, each enterprise sub-network including a plurality of edge nodes that interface with users and a core node;

separate the enterprise network from the plurality of common carriers via agnostic transport services for communicating through the plurality of common carriers, the agnostic transport services being provided by the plurality of common carriers to the enterprise network; and enable redundancy in the communicating among the plurality of geographically separated enterprise sub-networks at least by:
- connections between at least a subset of the edge nodes of a same geographically separated enterprise sub-network and the core node of another geographically separated enterprise sub-network and
- a distribution of enterprise data among the plurality of geographically separated enterprise sub-networks to enable autonomous transaction execution by any edge node of a respective geographically separated enterprise sub-network when that respective geographically separated enterprise sub-network is disconnected from the enterprise network.

12. The system of claim 11, wherein the incorporation of the plurality of geographically separated enterprise sub-networks includes the system being configured to interconnect the core node of a first of the plurality of geographically separated enterprise sub-networks to the core node of at least a second of the plurality of geographically separated enterprise sub-networks through the plurality of common carriers by a plurality of physical and virtual connections through the plurality of common carriers.

13. The system of claim 11, wherein the system separates the enterprise network from the plurality of common carriers, the system being further configured to:
- utilize common carrier interfaces and common carrier equipment that are separate from the services of the plurality of common carriers to support the communications through the plurality of common carriers, and
- enable the enterprise network to transport and support the communications through the plurality of common carriers independent of control by the plurality of common carriers.

14. The system of claim 11, wherein the distribution of the enterprise data includes a distribution of the enterprise data throughout the core nodes.

15. The system of claim 11, wherein the system generates the enterprise network by being further configured to interconnect the core nodes by a SONET/SDH ring through the plurality of common carriers.

16. The system of claim 11, wherein the distribution of the enterprise data includes a distribution of at least a subset of the enterprise data to the edge nodes and their corresponding core nodes.

17. The system of claim 11, being further configured to independently operate and independently support the enterprise network and the plurality of common carriers.

18. The system of claim 11, wherein the distribution of the enterprise data includes a distribution and storage of at least a subset of the enterprise data at the edge nodes.

19. The system of claim 11, being further configured to:
detect, in an edge node, that at least one of a connection to the core nodes is disabled and the enterprise network is disabled; and autonomously execute at least one transaction in the edge node.

20. The system of claim 11, wherein the enterprise data includes data associated with a transaction process that is distributed to at least one of the enterprise nodes and is non-local to the at least one of the plurality of geographically separated enterprise sub-networks.

\* \* \* \* \*